United States Patent

[11] 3,577,088

[72] Inventor William B. Goggins, Jr.
 Winchester, Mass.
[21] Appl. No. 795,796
[22] Filed Feb. 3, 1969
[45] Patented May 4, 1971
[73] Assignee The United States of America as represented by the Secretary of the Air Force

[54] SINE-COSINE TO MAGNITUDE-PHASE ANGLE CONVERTER
4 Claims, 1 Drawing Fig.

[52] U.S. Cl. .................................................. 328/134,
 328/155, 328/165
[51] Int. Cl. .................................................. H03d 3/06
[50] Field of Search .......................................... 328/133,
 134, 155, 165, 166, 167

[56] References Cited
UNITED STATES PATENTS

| | | | |
|---|---|---|---|
| 2,429,636 | 10/1947 | McCoy .................... | 328/134 |
| 2,635,226 | 4/1953 | Harris ..................... | 328/155X |
| 2,860,306 | 11/1958 | Towner ................... | 328/166X |
| 3,012,200 | 12/1961 | Hurvitz ................... | 328/134 |
| 3,042,871 | 7/1962 | Bergman ................. | 328/133 |
| 3,368,036 | 2/1968 | Carter et al. ............. | 178/67 |
| 3,390,343 | 6/1968 | Carter ..................... | 329/146 |
| 3,422,362 | 1/1969 | West ....................... | 328/134 |
| 3,464,016 | 8/1969 | Kerwin et al. ........... | 328/133X |

*Primary Examiner*—Donald D. Forrer
*Assistant Examiner*—R. C. Woodbridge
*Attorneys*—Harry A. Herbert, Jr. and George Fine

ABSTRACT: An analogue device for converting two voltages (AC or DC) each proportional to quadrature components $E \sin \Phi$ and $E \cos \Phi$ to two voltages, one proportional to $E$ and one proportional to the phase angle $\Phi$.

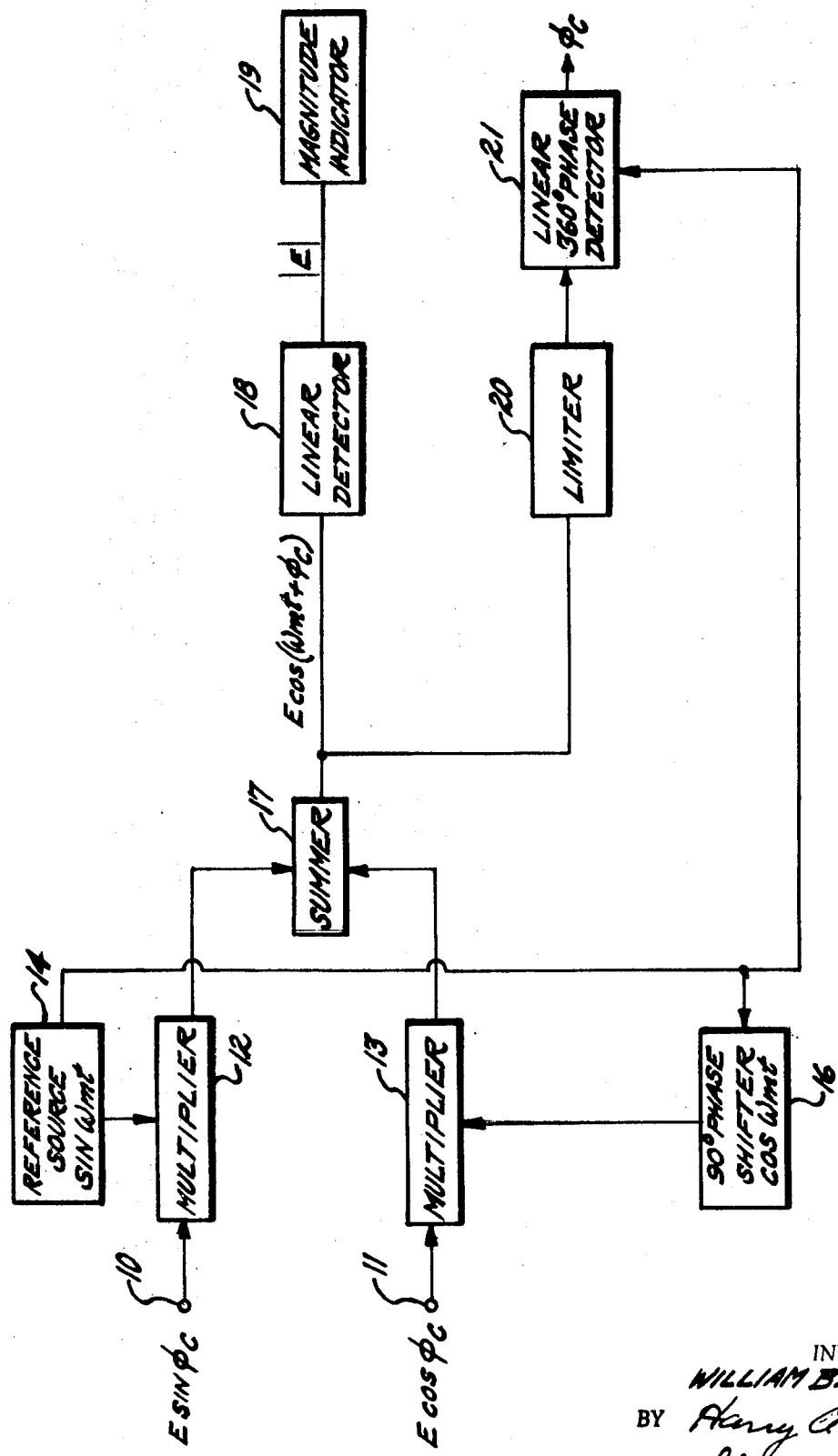

SINE-COSINE TO MAGNITUDE-PHASE ANGLE CONVERTER

BACKGROUND OF THE INVENTION

In the art of analogue computers, fire control acquisition and tracking systems, and synthetic aperture radars, there has existed the problem of rapid conversion from sine and cosine representation of a vector or phasor to the magnitude-phase angle representation of a phasor. There exists a prior arrangement for modifying two analogue voltages, particularly if they are vector components. The modification to the analogue quantity is in the form of applying an identical factor to both electrical voltages representing the analogue quantities. The result produced by the arrangement is that both analogue quantities are multiplied by one and the same factor. However, there are limitations in the prior art. In the present invention, conversion from sine and cosine representation to magnitude-phase angle is done directly and entirely electronically without the use of resolvers. Incorporation of a linear 360° phase detector makes this possible. By using a high reference frequency, the conversion can be accomplished as rapidly as necessary.

SUMMARY OF THE INVENTION

There is provided an analogue device for converting two voltages, each proportional to quadrature components $E \sin \Phi$ and $E \cos \Phi$ to two voltages, one proportional to E and one proportional to the phase angle $\Phi$. It is in a way an inverse resolver. One of the voltages is multiplied by a first reference signal having any convenient frequency and the other voltage is multiplied by a second signal phase shifted a predetermined magnitude from the first signal. The resulting signals are sinusoidal waveforms at amplitude E and at a frequency $\omega_m$. The resulting signals are added to provide a phasor given by $E \cos(\omega_m{}^t + \Phi_c)$. The magnitude E is determined by passing the signal through a linear detector, and the phase angle $\Phi_c$ is determined by passing $E_{cos}(\omega_m \text{at} + \Phi_c)$ through a limiter and then passed through a phase detector which simultaneously receives the aforesaid reference signal.

An object of the present invention is to provide an analogue device for converting two voltages, each proportional to quadrature components $E \sin \Phi$ and $E \cos \Phi$, one proportional to E and one proportional to the phase angle $\Phi$.

Another object of the present invention is to provide an analogue device for the conversion from sine and cosine representation to magnitude-phase angle representation.

The various features of novelty which characterize this invention are pointed out with particularlity in the claims annexed to and forming part of the specification. For a better understanding of the invention, however, its advantages and specific objects obtained with its use, reference should be had to the accompanying single drawing and descriptive matter in which is illustrated and described and preferred embodiment of the invention.

DESCRIPTION OF THE DRAWING

The single drawing of the invention shows in block diagram a sine-cosine to magnitude-phase converter.

DESCRIPTION OF THE PREFERRED EMBODIMENT

Now referring in detail to the single drawing of the invention, there is shown multipliers 12 and 13. Multiplier 12 receives a voltage signal, $E \sin \Phi_c$, by way of input terminal 10 and multiplier 13 receives a voltage signal, $E \cos \Phi_c$, by way of input terminal 11. The two input voltage signals may be bipolars (+ or −) voltages, either DC or AC. Multiplier 12 simultaneously receives a second input by way of reference source 14 which may be a signal generator providing a sinusoidal waveform with a preselected convenient frequency. Multiplier 12 multiplies voltage $E \sin \Phi_c$ by a sinusoidal waveform denoted as $\sin \omega_m{}^t$. The signal, $\sin \omega_m{}^t$, from reference source 14 i2 received by 90° phase shifter 16 to provide a signal, $\cos \omega_m{}^s$, for application to multiplier 13. Multiplier 13 multiplies the voltage $E \cos \Phi_c$ by $\cos \omega_m{}^t$. The resulting signals are sinusoidal waveforms at an amplitude E and at a frequency $\omega_m$. The two signals are added together in summer 17. Summer 17 may be any conventional summing network or amplifier which will respond properly to the frequency $\omega_m$. The result of the summation is the phasor given by $E \cos(\omega_m + \Phi_c)$. The magnitude E is determined by passing the signal through linear detector 18. Any conventional linear detector may be used. The output of linear detector 18 is applied to magnitude indicator 19 which may be a voltmeter or other suitable measuring device.

The phase angle $\Phi_c$ is determined by first passing $E \cos(\omega_m{}^t + \Phi_c)$ through limiter 20 in order to remove any amplitude information. Any conventional limiter which is phase stable over the expected dynamic range of E may be used. The phase angle $\Phi_c$ is then determined in linear phase detector 21 by comparing the output of limiter 20 with the reference frequency $\sin \omega_m{}^t$. Any conventional 360° phase degree detector may be used. The output of phase detector 21 is then a signal representative of the phase angle. Thus, in accordance with the present invention, there is determined E and $\Phi_c$.

Although the invention has been described with reference to a particular embodiment, it will be understood to those skilled in the art that the invention is capable of a variety of alternative embodiments within the spirit and scope of the appended claims.

I claim:

1. A sine-cosine to magnitude-phase converter comprising a first and second multiplier, said first multiplier receiving a voltage input, $E \sin \Phi$, and said second multiplier receiving a voltage input, $E \cos \Phi$, a reference source providing a sinusoidal signal, $E \sin \Phi_c$, of preselected frequency, also serving as an input to said first multiplier, means to shift said signal from said reference source 90° prior to being received by said second multiplier, said multiplier providing resulting signals of sinusoidal waveforms at an amplitude E and at a frequency $\omega_m$, means to add the resultant signals from said multipliers to provide a resultant phasor given by $E \cos(\omega_m{}^t + \Phi_c)$ representative of magnitude and phase, and means to detect linearly the absolute value of said resultant phasor $E \cos(\omega_m{}^t + \Phi_c)$.

2. A converter as described in claim 1 further including means to measure the magnitude of the output from said linear detector.

3. A converter as described in claim 2 further including a means to limit the amplitude of said resultant phasor, $E \cos(\omega_m{}^t \Phi_c)$, and means to compare the phase of the signal output from said amplitude limiter to said signal from said reference source.

4. A converter as described in claim 3 wherein said means to compare phase consists of a 360° phase detector.